Patented Nov. 30, 1943

2,335,599

UNITED STATES PATENT OFFICE 2,335,599

DERIVATIVES OF CYCLIC AMINOSULPHONIC ACID AMIDES

Fritz Mietzsch, Josef Klarer, and Robert Behnisch, Wuppertal-Elberfeld, Germany, assignors to Winthrop Chemical Company, Inc., New York, N. Y., a corporation of New York No Drawing. Application January 29, 1937, Serial No. 122,983. In Germany February 6, 1936

1 Claim. (Cl. 260—397.7)

This invention relates to derivatives of cyclic aminosulphonic acid amides.

United States Letters Patent No. 2,085,037 granted June 29, 1937, No.2,148,705 granted February 28, 1939, and No. 2,113,597 granted April 12, 1938, refer to the azo compounds which display an excellent action in cases of streptococci and staphylococci infection of warm-blooded individuals. In accordance with the said inventions it is essential that one radical attached to the azo group of the azo compounds obtained is a cyclic radical which either contains a sulphonic acid amide group in the para-position to the azo group or several sulphonic acid amide groups in the nucleus. These compounds are preferably obtained by the use of diazotized amino benzene sulphonic acid amides which contain a sulphonic acid amide group in the para-position to the amino group or several sulphonic acid amide groups attached to the nucleus. Such amino benzene sulphonic acid amides in contradistinction to other substituted amino benzene sulphonic acid amides, have themselves a bactericidal action. Their practical use is, however, restricted since their salts with strong acids which come into consideration for practical use, are acid to Congo red and therefore cause strong necrosis when used for injections.

In accordance with the present invention highly active compounds which do not display the aforementioned disadvantages are obtained by preparing N-alkylsulphonic acid, N-alkylsulphinic acid and N-alkylcarboxylic acid compounds of those aminosulphonic acid amides of the benzene series which either contain a sulphonic acid amide group in the para-position to the amino group or several sulphonic acid amide groups in the nucleus. Accordingly new products which are highly effective in case of streptococci and staphylococci infections are obtained by the manufacture of the compounds of the general formula:

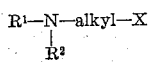

In this formula R¹ stands for a para-sulphamide- or a disulphamide-substituted radical of the benzene series or for a corresponding N-alkyl-, N-alkylcarbonic acid-, N-(4- to 5-membered)-alkylene, N-mononuclear arylalkyl or aryl, or N-mononuclear cycloalkyl substituted radical. Such N-alkyl- and N-alkylcarbonic acid-substituted sulphamide radicals are for instance mono- and di-methyl, -ethyl, -hydroxyethyl, -propyl and -butyl sulphamide groups and the N-sulphoglycide radical, N-(4- to 5-membered)-alkylene-substituted radicals are the N-sulpho-pyrrolidide- and the N-sulpho-piperidide radical, N-arylalkyl-, N-aryl- and N-cycloalkyl-sulphamide radicals are the N-benzyl-, N-phenylethyl-, N-amidosulphophenyl- and the N-cyclohexyl sulphamide radicals. Also the benzene nucleus bearing the sulphamide group(s) may contain substituents, for instance, alkyl groups, such as the methoxy and ethoxy group, furthermore halogen atoms, hydroxyl and carboxylic acid groups.

R² in the above formula is preferably hydrogen, but it may also stand for alkyl, such as methyl, ethyl, propyl, allyl, butyl and amyl, or for aralkyl, such as benzyl, or for aryl, such as phenyl.

X in the above formula stands for a —COOH, —SO₃H, or SO₂H group, for a correspondingly neutralized group respectively. The alkylene group may be, for instance, a methylene, ethylene, propylene, β-hydroxypropylene, butylene group and the like. The compounds containing as the group -alkylene-X the methane sulphonic acid group (—CH₂—SO₃H) represent a preferred embodiment of the present invention. The new compounds are in the form of their alkali metal salts readily soluble in water and may be administered perorally or by injection.

The compounds above specified may be obtained by substituting the amino group attached to the nucleus of amino sulphonic acid amides of the benzene series, which either contain a sulphonic acid amide group in para-position to the amino group attached to the nucleus or several sulphonic acid amide groups in the nucleus, by the action of alkylsulphonic acid, alkylsulphinic acid or alkylcarboxylic acid compounds which contain in the alkyl radical a substituent capable of being replaced. Compounds of the said kind with a substituent capable of being replaced are for instance hydroxy, halogen or oxide derivatives of these acids or their salts, such as formaldehyde bisulphite, formaldehyde sulphoxylate, chloroacetic acid, β-chlorethane sulphonic acid and β-chloro-β-hydroxypropanesulphonic acid.

The process can also be carried out using aminosulphonic acid amides of the benzene series which contain a sulphonic acid amide group in para-position to the amino group or several sulphonic acid amide groups in the nucleus, and the amino group of which attached to the nucleus is substituted by an alkyl group containing a substituent capable of being replaced, by replacing the said substituent by the sulphonic acid, sulphinic acid or carboxylic acid group. It is for instance possible to treat the reaction product obtained from the amino sulphonic acid amide and epichlorohydrin subsequently with sulphites or cyanides and if necessary to produce the acid groups in the manner known per se. Or, the process may be carried out in such a manner that in cyclic aminosulphonic acid amides which contain a sulphonic acid amide group in para-position to the amino group attached to the nucleus or several sulphonic acid amide groups in the nucleus and the amino group of which is substituted by an alkylsulphonic or carboxylic acid ester, amide or nitrile group, the latter group is subjected to saponification. The new compounds can also be obtained in such a manner that in N-alkylsulphonic acid, N-alkylsulphinic acid and N-alkylcarboxylic acid derivatives of amines of the benzene series which contain a sulphonic acid ester or halide group in para-position to the substituted amino group or several such groups in the nucleus, the latter group is transformed by the action of ammonia or amines into sulphonamide groups in the manner known per se.

The invention is further illustrated by the following examples without being restricted thereto:

*Example 1.*—17.2 grams of 4-aminobenzenesulphonic acid amide are heated on the waterbath with 17.2 grams of solid formaldehyde sodium bisulphite and 80 ccs. of water while stirring until the whole mixture has dissolved. On cooling the sodium salt of para (N-methylenesulphonic acid) - aminobenzene - sulphonamide crystallizes in colorless crystals which are readily soluble in water with a neutral reaction.

Instead of starting with solid formaldehyde sodium bisulphite also the equivalent quantity of sodium bisulphite solution and formaldehyde solution may be employed.

Other N-methanesulphonic acid derivatives are obtained in the following manner:

*Example 1a.*—26.2 grams of 4-aminobenzenesulphonic acid-benzylamide melting at 119° C. are heated with 60 ccs. of ethylene glycol and 20 grams of solid formaldehyde sodium bisulphite for a few minutes to 120° C. while shaking until the whole mixture has dissolved and a test portion of the melt clearly dissolves in water. On the addition of 260 ccs. of alcohol the reaction mixture solidifies to a crystal magma of para (N-sodium-methylene sulphonate)-benzene-benzylsulphonamide, which is filtered with suction and washed with alcohol. In a similar manner the 4-aminobenzenesulphonic acid butylamide melting at 100° C., the 4-aminobenzenesulphonic acid diethylamide melting at 104° C., the 4-aminobenzenesulphonic acid piperidide melting at 164° C., the aminobenzene-3.5-bis(sulphonic acid dimethylamide) melting at 183° C., the 4-aminobenzenesulphonic acid cyclohexylamide etc. may be transformed into their formaldehydebisulphite compounds.

*Example 1b.*—23.0 grams of 2 - methyl - 5 - ethoxy - 4 - aminobenzene - sulphonic acid amide melting at 139° C. are boiled with 100 ccs. of water and 17 grams of formaldehyde sodium bisulphite until the whole mixture has dissolved and the cooled solution subsequently treated with 500 ccs. of alcohol and 500 ccs. of ether. Thereby the 2-methyl-5-ethoxy-1 (N-sodium - methylene - sulphonate)-2-methyl-5-ethoxy-benzene - sulphonamide is precipitated which is filtered with suction and washed with ether. It is readily soluble in water.

*Example 1c.*—20.0 grams of 2.5 - dimethyl - 4 - aminobenzenesulphonic acid amide melting at 190° C. are heated with 17 grams of formaldehyde sodium bisulphite and 50 ccs. of ethylene glycol for 5 minutes until the whole mixture has dissolved and the cooled solution is treated with 400 ccs. of alcohol and 400 ccs. of ether. The separating formaldehyde bisulphite compound is filtered with suction, washed with ether and dried. In an analogous manner the 4-methylaminobenzenesulphonic acid amide melting at 173° C., the diphenylamine-4-sulphonic acid amide melting at 139° C., the 4-(4'-aminobenzenesulphonic acid amido) - benzene - sulphonic acid - monomethylamide melting at 141° C., the 4-(β-phenylethylamino)-benzenesulphonic acid amide may be reacted with formaldehyde sodium bisulphite.

*Example 2.*—9.45 grams of mono-chloracetic acid are dissolved in 100 ccs. of normal caustic soda solution. 17.2 grams of 4-aminobenzenesulphonic acid amide are added and the mixture is heated for half an hour on the boiling water bath while stirring. Then 100 ccs. of boiling water are added. The solution is filtered with suction and cooled. After filtration the phenylglycine 4-sulphonic acid amide crystallizes in colorless crystals which are slightly soluble in cold water, readily soluble in dilute sodium carbonate solution. It is purified by redissolving from sodium bicarbonate and hydrochloric acid and by recrystallization from boiling water and melts at 175° C.

*Example 2a.*—The phenyl glycine 4-sulphonic acid amide is obtained in better yields by dissolving 17.2 grams of 4-aminobenzene-sulphonic acid amide in 100 ccs. of boiling water, treating it with 5 grams of calcium carbonate and adding drop by drop 12.2 grams of chloroacetic acid ethylester while vigorously stirring. The calcium carbonate is decomposed with the evolution of carbonic acid. On cooling the 4-sulphonic acid amide-phenylaminoacetic acid ethylester crystallizes in beautiful crystals which melt after recrystallisation from alcohol at 144° C. The ester dissolves on boiling for half an hour with a slight excess of caustic soda solution. After cooling the phenyl glycine 4-sulphonic acid amide is separated by the addition of dilute hydrochloric acid and recrystallized from boiling water. It is also possible to transform the ester with methylalcoholic ammonia into the 4-sulphonic acid amidephenylamino-acetic acid amide which after recrystallization from methylalcohol melts at 207° C. while subsequently heating it with 15% hydrochloric acid under reflux. Also in this case the phenyl glycine 4-sulphonic acid amide melting at 175° C. is obtained.

*Example 3.*—25 grams of 30% formaldehyde solution are added drop by drop to a concentrated aqueous solution of 12.5 grams of sodium cyanide while cooling. Then 50 grams of 4-aminobenzenesulphonic acid dimethylamide melting at 168° C. and 250 ccs. of alcohol are added and the mixture is boiled for several hours on the water-bath while observing the ammoniaevolution. Then the alcohol is distilled off, the residue taken up in water, filtered with animal charcoal and acidified with hydrochloric acid. The precipitated 4-sulphonic acid dimethylamide phenyl glycine is recrystallized from methylalcohol and forms colorless crystals melting at 187° C.

The same compound is obtained by introducing 20 grams of the acid potassium salt of the phenyl glycine 4-sulphonic acid (obtained by the action of sodium cyanide and formaldehyde upon aminobenzene-4-sulphonic acid, saponification of the ω-cyanmethyl compound formed with potassium hydroxide and acidification) into 80 ccs. of chlorosulphonic acid and heating for 2 hours on the water-bath. After cooling the mixture is poured on to ice and the precipitate of the phenyl glycine 4-sulphonic acid chloride is heated with excess 20% dimethylamine solution for half an hour to about 60° C. After acidifying with the resulting hot solution hydrochloric acid the phenyl glycine 4-sulphonic acid dimethylamide separates. This product after recrystallization from aqueous alcohol melts at 187° C.

*Example 4.*—21.4 grams of 4-monomethylamino-benzene-sulphonic acid dimethylamide melting at 152° C. are heated to boiling with 60 ccs. of methylalcohol and 10 grams of epichlorohydrin for 8 hours while stirring. The methyl alcohol is distilled off and the residue mixed with 50 ccs. of 40% caustic soda solution while stirring for 2 hours. The solution is filtered through a suction filter and washed with water. The residue is boiled with 35 ccs. of 30% sodium bisulphite solution for 3 hours while stirring and dried. The alpha-(4-dimethylamidosulphonylphenyl) - methylamino - β - hydroxypropane - gamma-sulphonic acid sodium obtained in this manner is a colorless powder which is readily soluble in water.

We claim:
A compound corresponding to the formula

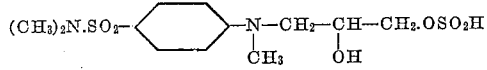

FRITZ MIETZSCH.
JOSEF KLARER.
ROBERT BEHNISCH.